US010099666B2

(12) United States Patent
Miura

(10) Patent No.: US 10,099,666 B2
(45) Date of Patent: Oct. 16, 2018

(54) EMERGENCY CONTROLLER

(71) Applicant: dak Co., Ltd., Akita (JP)

(72) Inventor: Ryohei Miura, Akita (JP)

(73) Assignee: DAK CO., LTD., Akita (JP)

( * ) Notice: Subject to any disclaimer, the term of this patent is extended or adjusted under 35 U.S.C. 154(b) by 0 days.

(21) Appl. No.: 15/317,110

(22) PCT Filed: Jun. 24, 2016

(86) PCT No.: PCT/JP2016/068769
§ 371 (c)(1),
(2) Date: Dec. 7, 2016

(87) PCT Pub. No.: WO2017/002714
PCT Pub. Date: Jan. 5, 2017

(65) Prior Publication Data
US 2017/0297543 A1    Oct. 19, 2017

(30) Foreign Application Priority Data

Jul. 1, 2015    (JP) ................... 2015-132505

(51) Int. Cl.
*B60T 7/14*    (2006.01)
*B60T 11/04*    (2006.01)
(Continued)

(52) U.S. Cl.
CPC ............... *B60T 7/14* (2013.01); *B60K 28/04* (2013.01); *B60T 7/102* (2013.01); *B60T 11/046* (2013.01);
(Continued)

(58) Field of Classification Search
CPC .......... B60T 7/14; B60T 7/102; B60T 11/102; B60T 11/046; B60K 28/04; B60Y 2200/252; B60Y 2302/05

See application file for complete search history.

(56) References Cited

U.S. PATENT DOCUMENTS 3,175,647 A * 3/1965 Fabbro ................. B60T 11/102
188/106 F
3,724,911 A * 4/1973 Chevreux ................ B60T 1/06
188/106 F
(Continued)

FOREIGN PATENT DOCUMENTS

JP    55-48531 U    3/1980
JP    7-9891 A    1/1995
(Continued)

OTHER PUBLICATIONS

International Search Report in PCT/JP2016/068769, dated Sep. 13, 2016.
Written Opinion in PCT/JP2016/068769, dated Sep. 13, 2016.

*Primary Examiner* — Xuan Lan Nguyen
(74) *Attorney, Agent, or Firm* — Hauptman Ham, LLP

(57) ABSTRACT

An emergency controller includes an emergency stop switch to be activated upon detection of an emergency, a control section to be enabled upon activation of the emergency stop switch, and an emergency stop mechanism configured to execute and release braking by a brake mechanism under control of the control section. The control section is configured to perform execution control for causing the emergency stop mechanism to execute braking by the brake mechanism and for stopping operation of the engine upon the condition that the emergency stop switch is activated while the engine is in operation. The control section is configured to perform restoration control for causing the emergency stop mechanism to release the braking by the brake mechanism upon the condition that the emergency stop switch is deactivated and the engine is started.

2 Claims, 9 Drawing Sheets

(51) Int. Cl.
    *B60T 11/10*      (2006.01)
    *B60T 7/10*       (2006.01)
    *B60K 28/04*    (2006.01)

(52) U.S. Cl.
    CPC ....... *B60T 11/102* (2013.01); *B60Y 2200/252* (2013.01); *B60Y 2302/05* (2013.01)

(56) References Cited

U.S. PATENT DOCUMENTS

| | | |
|---|---|---|
| 3,825,092 A | 7/1974 | Graydon et al. |
| 3,957,131 A | 5/1976 | Perkins |
| 4,037,683 A | 7/1977 | Lebell |
| 5,642,788 A | 7/1997 | Mabbott |
| 5,701,977 A | 12/1997 | Vrevich |
| 6,412,583 B1 | 7/2002 | Caple |
| 6,612,406 B1 | 9/2003 | Romak |
| 7,488,047 B2 * | 2/2009 | Hatano .................. B60T 8/267 303/122.09 |

FOREIGN PATENT DOCUMENTS

| | | |
|---|---|---|
| JP | 2006-9716 A | 1/2006 |
| JP | 2011-246000 A | 12/2011 |

\* cited by examiner

EMERGENCY CONTROLLER

RELATED APPLICATIONS

The present application is a National Stage of PCT International Application No. PCT/JP2016/68769, filed Jun. 24, 2016, which claims priority from Japanese Application Number 2015-132505, filed Jul. 1, 2015.

TECHNICAL FIELD

The present invention relates to emergency controllers for vehicles such as snowmobiles, and more specifically, to emergency controllers operable to safely stop a vehicle in a case where the driver leaves the vehicle while the vehicle is running.

BACKGROUND ART

Some vehicles, such as snowmobiles, include an automatic engine stop system that is operable to stop the engine automatically in such a case that the driver falls off the vehicle while the vehicle is still running. A regular automatic engine stop system includes an emergency engine stop switch placed in the forebody, as well as a tether cord with a first end connected to a cap for the emergency engine stop switch and a second end fastened to the driver's body. The emergency engine stop switch is in an off state when the cap is on, the engine is kept driven in this state. Meanwhile, when the cap comes off, the emergency engine stop switch is turned on, and the engine is stopped. The cap is engagingly attached so as to come off upon being pulled at a certain strength. Then, when the driver falls off the vehicle and the tether cord is pulled, the cap comes off and the emergency engine stop switch is turned on, such that the engine is stopped.

In a case, however, where the driver falls off the vehicle on, for example, a slope, the vehicle does not stop immediately due to the law of inertia even when the engine is stopped by the automatic engine stop system. Moreover, in a case where the emergency engine stop switch is activated to stop the engine on a slope, the engine will be stopped, whereas a driving mechanism such as a track belt is not locked by that, and the vehicle could continue to move forward on the slope with the track belt turning. Such a vehicle without the driver is uncontrollable and is thus dangerous.

Against this backdrop, Patent Document 1 discloses a mechanism that is operable to turn on a switch for stopping the engine as well as to pull a brake lever to apply the brakes when a tether cord is pulled. The mechanism disclosed in Patent Document 1 has a slidable shaft that is engaged both with a toggle switch for starting/stopping the engine and the brake lever; a spring for sliding the shaft; a pin for regulating the urge to be applied by the spring; and a tether cord connected to the pin. When the tether cord is pulled and the pin is released, the shaft is caused to slide by the spring, such that the toggle switch is turned off and the brake lever is pulled.

PRIOR ART DOCUMENT

Patent Document

Patent Document 1: U.S. Pat. No. 3,957,131

SUMMARY OF THE INVENTION

Problems to be Solved by the Invention

However, with the mechanism disclosed in Patent Document 1, the shaft and pin need to be returned to the original positions manually in order to bring the vehicle back to a runnable state, which is inconvenient.

The present invention was made in view of the foregoing problem, and it is an object of the invention to provide an emergency controller that is operable to safely stop a vehicle even in a case where the driver is, for example, thrown and leaves the vehicle while the vehicle is running, and to easily bring the vehicle back to a runnable state.

Means for Solving the Problems

The present invention for achieving the above-mentioned purpose is an emergency controller installable in a vehicle including an engine and a brake mechanism. The emergency controller includes: an emergency stop switch to be activated upon detection of an emergency; a control section to be enabled upon activation of the emergency stop switch; and an emergency stop mechanism configured to execute and release braking by the brake mechanism under control of the control section. The control section is configured to perform execution control for causing the emergency stop mechanism to execute braking by the brake mechanism and stopping operation of the engine upon the condition that the emergency stop switch is activated while the engine is in operation. The control section is configured to perform restoration control for causing the emergency stop mechanism to release the braking by the brake mechanism upon the condition that the emergency stop switch is deactivated and the engine is started. According to the present invention, a vehicle is safely stopped even in a case where the driver leaves the running vehicle accidentally, and the original state is restored by the same operation as a normal engine start in restarting the engine of the vehicle.

The brake mechanism may be a hydraulic brake mechanism. The brake mechanism may include: a brake lever; a first hydraulic cylinder having a first piston rod that is slidable in response to an operation of the brake lever; a brake hose connected to the first hydraulic cylinder; a brake pad connected to the brake hose; and a tank for feeding the brake hose with brake fluid. The emergency stop mechanism may further include a second hydraulic cylinder. The second hydraulic cylinder may be at a position upstream of the first hydraulic cylinder or a position downstream of the first hydraulic cylinder, and may have a second piston rod that is slidable in response to a signal from the control section. Upon the condition that the second piston rod is slid, communication may be blocked between the tank and the brake hose downstream of the second hydraulic cylinder and a rise in pressure may be caused inside the brake hose downstream of the second hydraulic cylinder, such that the brake pad is pressed. Thus, the emergency stop mechanism is implemented by simply adding the second hydraulic cylinder to an existing hydraulic brake mechanism.

The emergency stop mechanism may include: a pressing member that is operable to press the second piston rod of the second hydraulic cylinder; and a driving mechanism that is operable to move the pressing member. The driving mechanism may be configured to be driven forwardly according to the execution control to press the piston rod. The driving mechanism may be configured to be driven reversely according to the restoration control to release the pressure on the piston rod. Thus, since a single mechanism implements execution and release of braking by the brake mechanism, the size reduction is easily achieved, with increased reliability.

The brake mechanism may include: a brake lever; and a brake pad to be pressed by a disc rotor in response to an operation of the brake lever. The emergency stop mechanism may include: a first mechanical portion attached to the brake lever; and a second mechanical portion that is operable to actuate the first mechanical portion. The second mechanical portion may be configured to actuate the first mechanical portion in response to a signal from the control section. Thus, the emergency stop mechanism is implemented by simply adding the first mechanical portion and the second mechanical portion to an existing brake mechanism.

The first mechanical portion may include: a rotor engagingly attached to the brake lever; and a wire rope connected to the rotor. The second mechanical portion may include: a drum to be wound with the wire rope; and a driving mechanism configured to rotate the drum. The emergency stop mechanism may be configured such that the driving mechanism is driven forwardly according to the execution control to cause the wire rope to be reeled on the drum and to actuate the brake lever, and that the driving mechanism is driven reversely according to the restoration control to cause the wire rope to be sent out from the drum to release the actuation of the brake lever. Thus, since a single mechanism implements execution and release of braking by the brake mechanism, the size reduction is easily achieved, with increased reliability.

Effects of the Invention

According to the present invention, an emergency controller is provided which is operable to safely stop a vehicle even in a case where the driver leaves the vehicle in a running state and to easily bring the vehicle back to a runnable state.

EMBODIMENTS FOR CARRYING THE INVENTION

Embodiments of the present invention are described in detail below with reference to the drawings. In the following description, a snowmobile is taken as an example, but the present invention provides the same effects when applied to a vehicle with the aforementioned problem. Vehicles with the aforementioned problem includes off-road buggies and trikes besides snowmobiles.

First Embodiment

Figure 1:
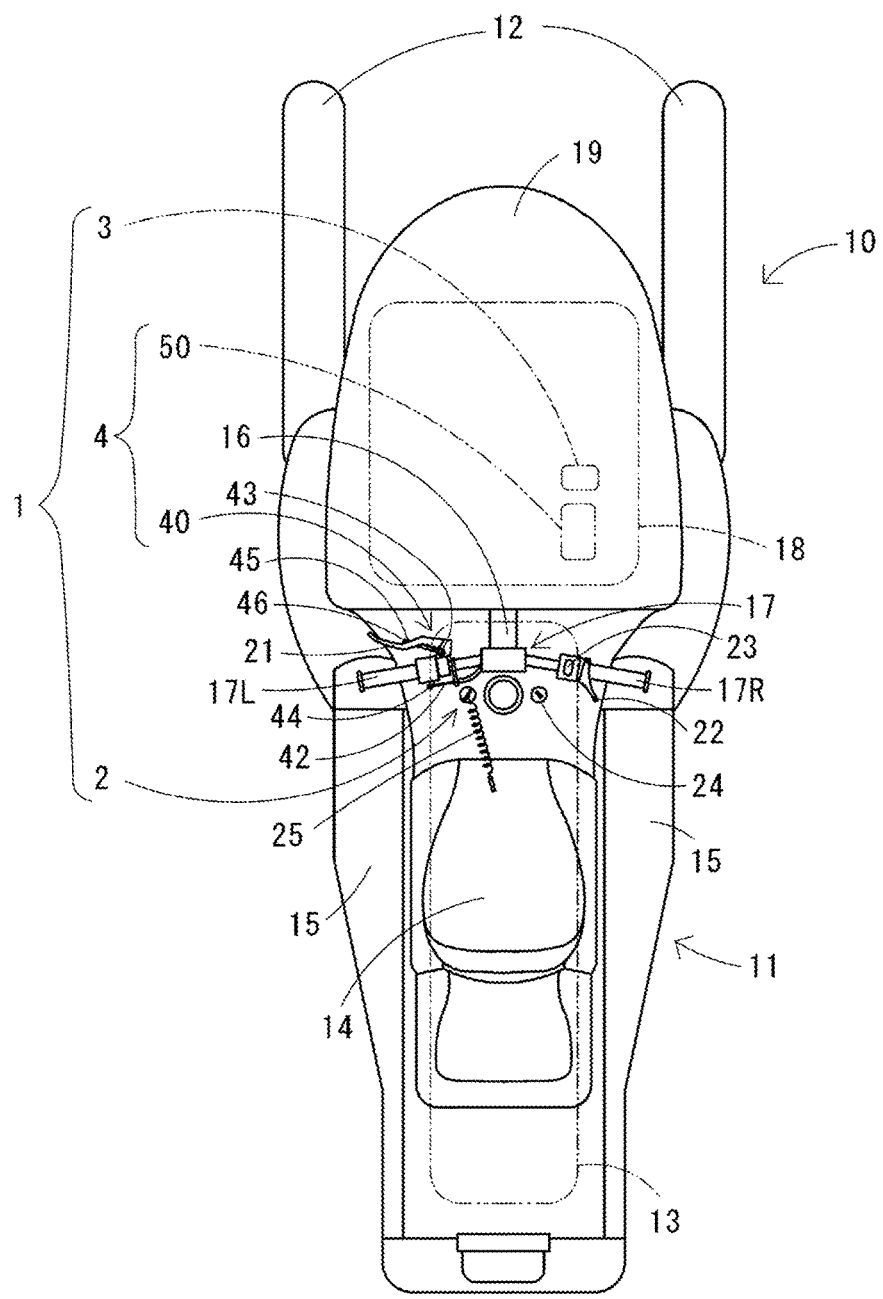
FIG. 1 is a plan view of a snowmobile according to a first embodiment of the invention.

FIG. 1 is a plan view depicting an exemplary snowmobile 10 according to a first embodiment of the invention. As depicted in FIG. 1, snowmobile 10 includes a vehicle body 11 extending in a fore-aft direction, paired steering skis 12 each attached to the right and left sides of a fore-lower portion of vehicle body 11, a driving track belt mechanism 13 extending from a medio-lower portion to an aft-lower portion of vehicle body 11, an engine (not shown), and a brake mechanism (not shown). In FIG. 1, an approximate position of driving track belt mechanism 13 is indicated by an imaginary line (dashed two dotted line) for the sake of convenience of explanation.

Vehicle body 11 includes a seat 14 to be seated by a driver, steps 15 arranged at the right and left sides of seat 14, a shaft 16 coupled to steering skis 12, a handlebar 17 for manipulating steering skis 12 by means of shaft 16, an engine chamber 18 containing components such as the engine, and an engine hood 19 covering engine chamber 18. In FIG. 1, an approximate position of engine chamber 18 is indicated by an imaginary line (dashed two dotted lines) for the sake of convenience of explanation.

Driving track belt mechanism 13 includes, for example, a driving wheel arranged on the fore side, a driven wheel arranged on the aft side, a plurality of intermediate wheels arranged between these driving/driven wheels, and a rubber continuous track wound around the wheels. Snowmobile 10 runs on snow with this continuous track propelled by the power of the engine. The driving wheel of driving track belt mechanism 13 is mounted with a brake mechanism (not shown) such as a disc brake.

The engine of snowmobile 10 is started by a main switch 24 positioned in front of seat 14. Main switch 24 has switching positions of a starting position for enabling a starting circuit, an ON position for activating an ignition system, and an OFF position for deactivating the ignition system. When the starting circuit is enabled, the engine is started. When the main switch 24 is turned to the ON position, the ignition system actuates the ignition coil, and the engine is ignited and driven. The gear is in neutral while in an idling state from the engine startup.

Handlebar 17 has a right handle 17R mounted with a throttle lever 22. The driver grips throttle lever 22 and brings the lever closer to right handle 17R, causing the power to be transmitted to driving track belt mechanism 13, such that snowmobile 10 starts moving. Since throttle lever 22 is urged by, for example, a spring in a direction to be drawn apart from right handle 17R, throttle lever 22 returns to the original position when the driver lets go hold of throttle lever 22, and transmission of power to driving track belt mechanism 13 is disconnected and the engine returns to idling.

Handlebar 17 has a left handle 17L mounted with a brake lever 21 for controlling the brake mechanism. When the driver grips brake lever 21 and brings the lever closer to left handle 17L, the rotation of driving track belt mechanism 13 is locked by the brake mechanism (not shown), such that the brakes are applied.

In this embodiment, a hydraulic brake mechanism is used for the brake mechanism. More specifically, the brake mechanism operates to apply the brakes in such a manner that brake lever 21 is gripped to cause rise in pressure inside the brake hose, thus bringing a brake pad pressed against a disc rotor of the driving track belt mechanism.

Right handle 17R is mounted with a manual engine stop switch 23 for stopping the engine manually, independently of stopping the engine by turning main switch 24. The driver simply presses manual engine stop switch 23 to stop operation of the engine. To restart the engine, the driver resets manual engine stop switch 23 to the original position, and then turns main switch 24 to the starting position. Meanwhile, according to a normal engine stop procedure, the driver lets go hold of throttle lever 22 and operates brake lever 21 to stop snowmobile 10, and then turns main switch 24 to the OFF position.

In snowmobile 10 with the above-described configuration, an emergency controller 1 is installed which is operable to automatically stop snowmobile 10 without the driver's operating brake lever 21 or manual engine stop switch 23 in an emergency situation where, for example, the driver falls off snowmobile 10. Emergency controller 1 is installed in front of seat 14 and includes an emergency stop switch 2 to be turned on upon detection of an emergency; a control section 3 to be activated when emergency stop switch 2 is turned on; and an emergency stop mechanism 4 (see FIGS. 2A, 2B, 3A and 3B) for executing and releasing braking by the brake mechanism under the control of control section 3. In FIG. 1, an approximate position of control section 3 is indicated by an imaginary line (dashed two dotted line) for the sake of convenience of explanation.

Emergency stop mechanism 4 includes a first mechanical portion 40 attached to brake lever 21 of left handle 17L, and a second mechanical portion 50 placed in engine chamber 18. In FIG. 1, an approximate position of second mechanical portion 50 is indicated by an imaginary line (dashed two dotted line) for the sake of convenience of explanation.

Emergency stop switch 2 has a detachable cap, and the cap is connected to a tether cord 25. Tether cord 25 is attached to the body of the driver, and the body and the cap are connected by tether cord 25 while the driver is seated on seat 14. At this time, emergency stop switch 2 is in an off state, and the vehicle in a normal runnable condition.

When the driver leaves seat 14 with tether cord 25 on while the engine is in operation, tether cord 25 pulls the cap to turn on emergency stop switch 2, such that control section 3 is enabled. Then, control section 3 performs execution control to cause emergency stop mechanism 4 to execute braking by the brake mechanism and to cause the ignition system to stop operation of the engine.

After that, when the driver puts the cap back on emergency stop switch 2 and turns main switch 24 to the starting position in order to drive snowmobile 10 again, the engine gets started, and control section 3 executes restoration control over emergency stop mechanism 4 to release braking by the brake mechanism.

Figure 2A:
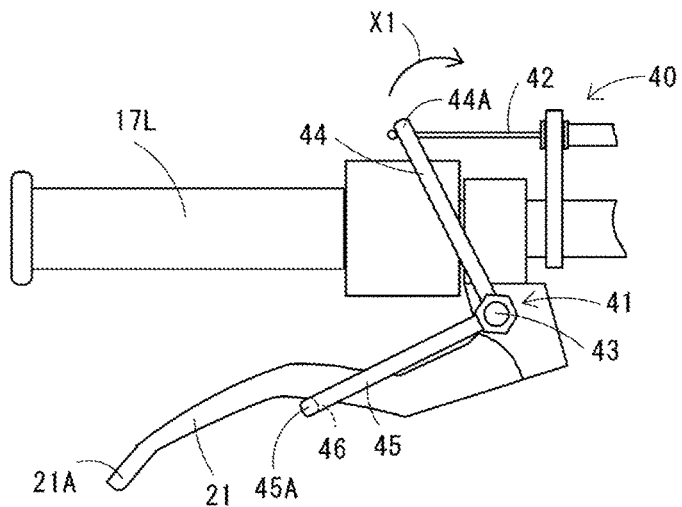
FIGS. 2A and 2B depict a portion of an exemplary emergency stop mechanism of a first embodiment.
Figure 2B:
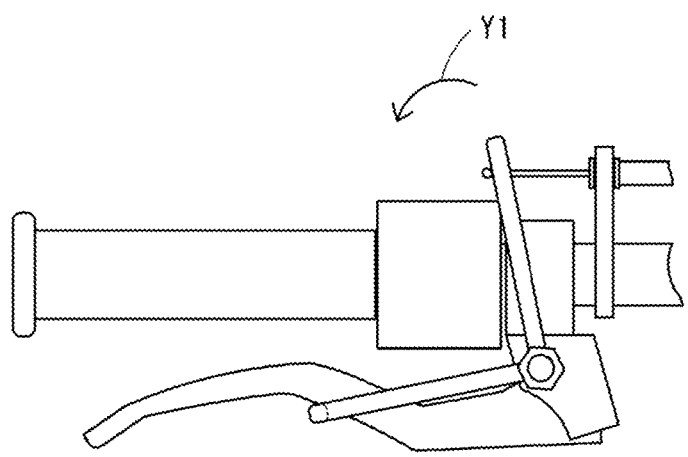

FIGS. 2A and 2B are enlarged views of left handle 17L as seen from the bottom of snowmobile 10 and depict first mechanical portion 40 constituting a portion of emergency stop mechanism 4 comprising emergency controller 1. First mechanical portion 40 includes a rotor 41 engaged with brake lever 21, and a wire rope 42 attached to rotor 41. Rotor 41 includes two bars 44 and 45 that extend outward from a rotary shaft 43. Bar 44 and bar 45 are substantially orthogonal to each other. A distal end 44A of bar 44 is connected wire rope 42. A distal end 45A of bar 45 has a latch 46 protruding backward in the figure and in contact with brake lever 21.

In the above configuration, as depicted in FIG. 2A, wire rope 42 is moved rightward in the figure, such that rotor 41 is swung in the direction of the arrow X1 with respect to rotary shaft 43. As depicted in FIG. 2B, latch 46 brings brake lever 21 closer to left handle 17L as rotor 41 rotates, such that the brakes are applied. In other words, wire rope 42 works to produce the same condition as the driver grips brake lever 21, such that the brakes are applied on the driving track belt mechanism.

Figure 3A:
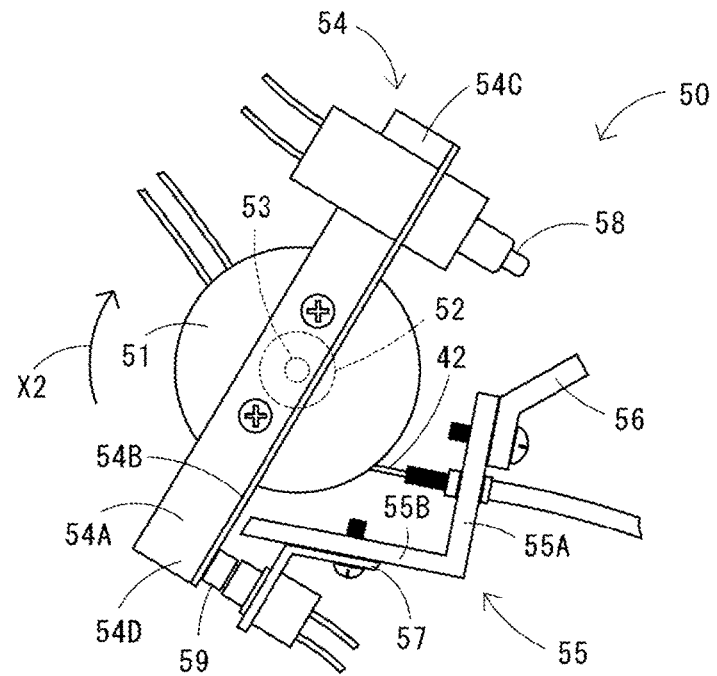
FIGS. 3A and 3B depict the remaining portion of the exemplary emergency stop mechanism of the first embodiment.
Figure 3B:
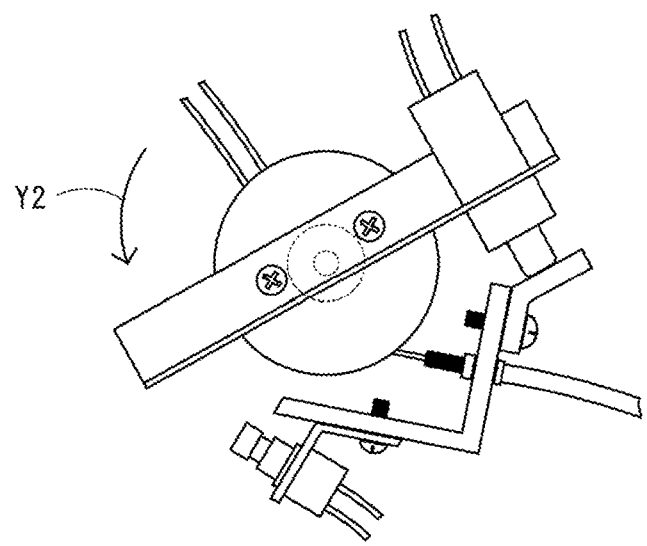

FIGS. 3A and 3B are schematic diagrams of second mechanical portion 50 that is placed in engine chamber 18 and constitutes a portion of emergency stop mechanism 4 comprising emergency controller 1. Second mechanical portion 50 includes a drum 51 wound with wire rope 42 of first mechanical portion 40, a driving mechanism 52 to rotate drum 51, a rotary plate 54 to rotate with the rotation of drum 51, and a support plate 55 that is positioned opposite rotary plate 54 and is fixed inside the engine chamber to support wire rope 42.

Rotary plate 54 has a first surface 54A that is orthogonal to a rotary shaft 53 and a second surface 54B that is orthogonal to first surface 54A. Further, rotary plate 54 has a first end 54C and a second end 54D. In this embodiment, a first limit switch 58 is mounted on second surface 54B proximate to first end 54C.

Support plate 55 includes a first planar portion 55A and a second planar portion 55B that cross each other. In this embodiment, wire rope 42 is passed through an aperture (not shown) in first planar portion 55A for support. First planar portion 55A has an end that is coupled to a piece 56. Piece 56 is positioned so as to collide with first limit switch 58 as drum 51 rotates in the direction of the arrow X2 in FIG. 3A. A second limit switch 59 is mounted on second planar portion 55B of support plate 55 by means of a fixture 57. Second limit switch 59 is positioned so as to collide with second surface 54B of rotary plate 54 as drum 51 rotates in the direction of the arrow Y2 in FIG. 3B.

First limit switch 58 is configured to detect a state in which a distal end 21A of brake lever 21 is located at a position closest from left handle 17L, i.e., a state in which braking by the brake mechanism is at execution. Second limit switch 59 is configured to detect a state in which distal end 21A of brake lever 21 is located at a position farthest from left handle 17L, i.e., a state in which braking by the brake mechanism is at release.

Description is given of an executing operation of emergency stop mechanism 4 in the above-described configuration. For example, if the driver is thrown from snowmobile 10, the cap is pulled by tether cord 25 connected to the driver, such that emergency stop switch 2 is turned on. When emergency stop switch 2 is turned on, driving mechanism 52 is driven forwardly under the control of control section 3, such that drum 51 rotates about rotary shaft 53 in the direction of the arrow X2 in FIG. 3A. As drum 51 rotates in the direction of the arrow X2, wire rope 42 is reeled onto drum 51. Thus, rotor 41 rotates about rotary shaft 43 in the direction of the arrow X1 in FIG. 2A, bringing brake lever 21 closer to left handle 17L. At this time, the rotation of driving track belt mechanism 13 is locked, such that the brakes are applied. Right after that, the ignition system causes the engine to stop operation under the control of control section 3. It is to be noted that in the case where snowmobile 10 includes a battery, for example, braking by the brake mechanism may be simultaneously effected as stopping the operation of the engine, and braking by the brake mechanism does not have to be effected before stopping the operation of the engine. In this manner, snowmobile 10 is prevented from moving forward even on, for example, a slope by stopping the engine as well as executing braking by the brake mechanism in an emergency situation. In other words, snowmobile 10 is safely stopped even when the driver is thrown.

Next, description is given of a restoring operation of emergency stop mechanism 4. The driver thrown from snowmobile 10 goes back to snowmobile 10 and puts the cap of tether cord 25 on emergency stop switch 2. In this manner, emergency stop switch 2 is reset to the off state. When the driver turns main switch 24 to the starting position in the off state of emergency stop switch 2 and the engine is started, driving mechanism 52 is driven reversely under the control of control section 3, and drum 51 rotates about rotary shaft 53 in the direction of the arrow Y2 in FIG. 3B. As drum 51 rotates in the direction of the arrow Y2, wire rope 42 is unreeled from drum 51. Thus, rotor 41 depicted in FIGS. 2A and 2B rotates about rotary shaft 43 in the direction of the arrow Y1 in FIG. 2B, and brake lever 21 moves away from left handle 17L, such that the lock on the rotation of driving track belt mechanism 13 is released. In other words, the driver simply brings tether cord 25 to the original state and performs a normal engine start operation to release an emergency stop and restart the engine.

Figure 4:
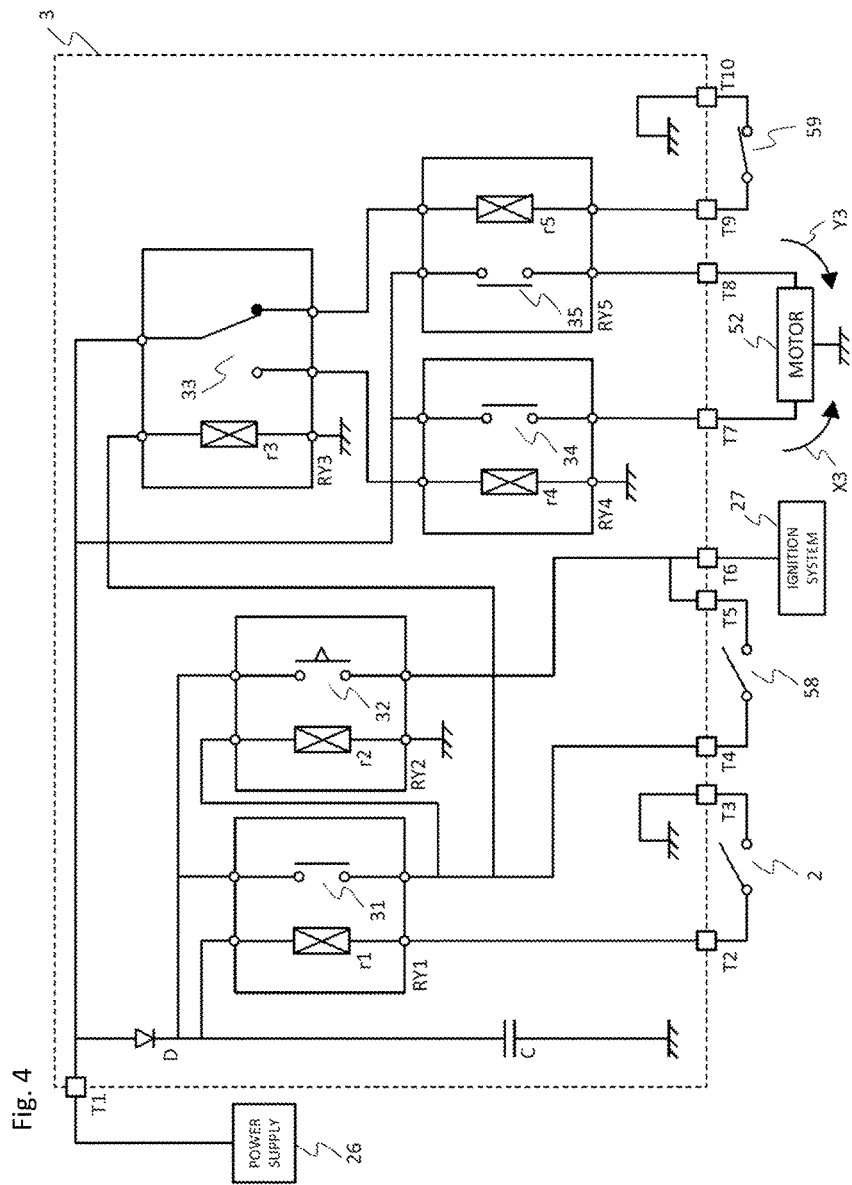
FIG. 4 depicts an exemplary control section.

FIG. 4 depicts an exemplary control section 3. Control section 3 includes five relays RY1 to RY5, a backflow prevention diode D, and a capacitor C. Control section 3 has a terminal T1 connected to a power supply 26, terminals T2 and T3 connected to emergency stop switch 2, terminals T4 and T5 connected to first limit switch 58, a terminal T6 connected to an ignition system 27 of the engine, terminals T7 and T8 connected to driving mechanism 52, and terminals T9 and T10 connected to second limit switch 59.

For example, a power supply for headlight (not shown) is applicable for power supply 26. In this case, capacitor C functions as a standby power supply to be activated upon engine shutdown. The circuit depicted in FIG. 4 is an example in which snowmobile 10 does not include a battery. It is to be noted that in a snowmobile 10 mounted with a battery, the battery may serve as power supply 26. In this case, capacitor C may be spared, and a portion of the circuit depicted in FIG. 4 is suitably modified.

Emergency stop switch 2 closes when turned on. First limit switch 58 closes when turned on. Second limit switch 59 opens when turned on. Ignition system 27 causes the engine to stop operation when a current flows from terminal T6 of control section 3 to ignition system 27.

Relay RY1 closes a contact 31 when coil r1 is energized. Relay RY2 is an on-delay timer and closes a contact 32 after a predetermined length of time, for example, two to three seconds, from when a coil r2 is energized. In relay RY3, the circle sign of a contact 33 indicates a normally open contact side, while the black circle sign indicates a normally closed contact side. Contact 33 switches from the normally closed contact side to the normally open contact side when a coil r3 of relay RY3 is energized.

The switching of contact 33 changes the terminal to pass a current through to driving mechanism 52. In FIGS. 4 to 8, the arrow X3 indicates a forward direction in which driving mechanism 52 is driven forwardly, and the arrow Y3 indicates a reverse direction in which driving mechanism 52 is driven reversely. A current passing terminal T7 to driving mechanism 52 causes driving mechanism 52 to be driven forwardly, such that drum 51 is rotated in the direction of the arrow X2 in FIG. 3A. A current passing terminal T8 to driving mechanism 52 causes driving mechanism 52 to be driven reversely, such that rotate drum 51 is rotated in the direction of the arrow Y2 in FIG. 3B.

Figure 5:
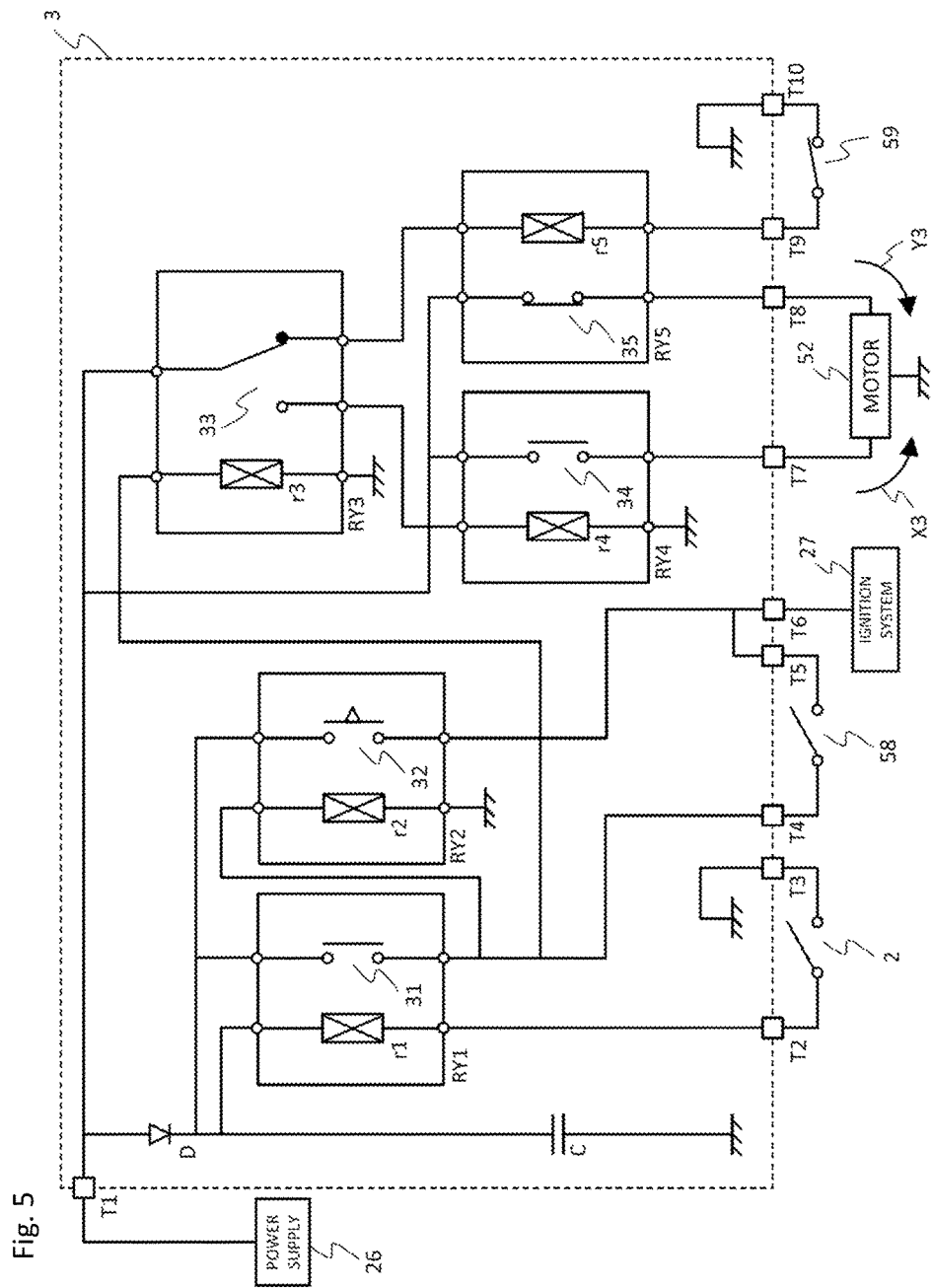
FIG. 5 is an operational explanatory diagram of the control section.
Figure 6:
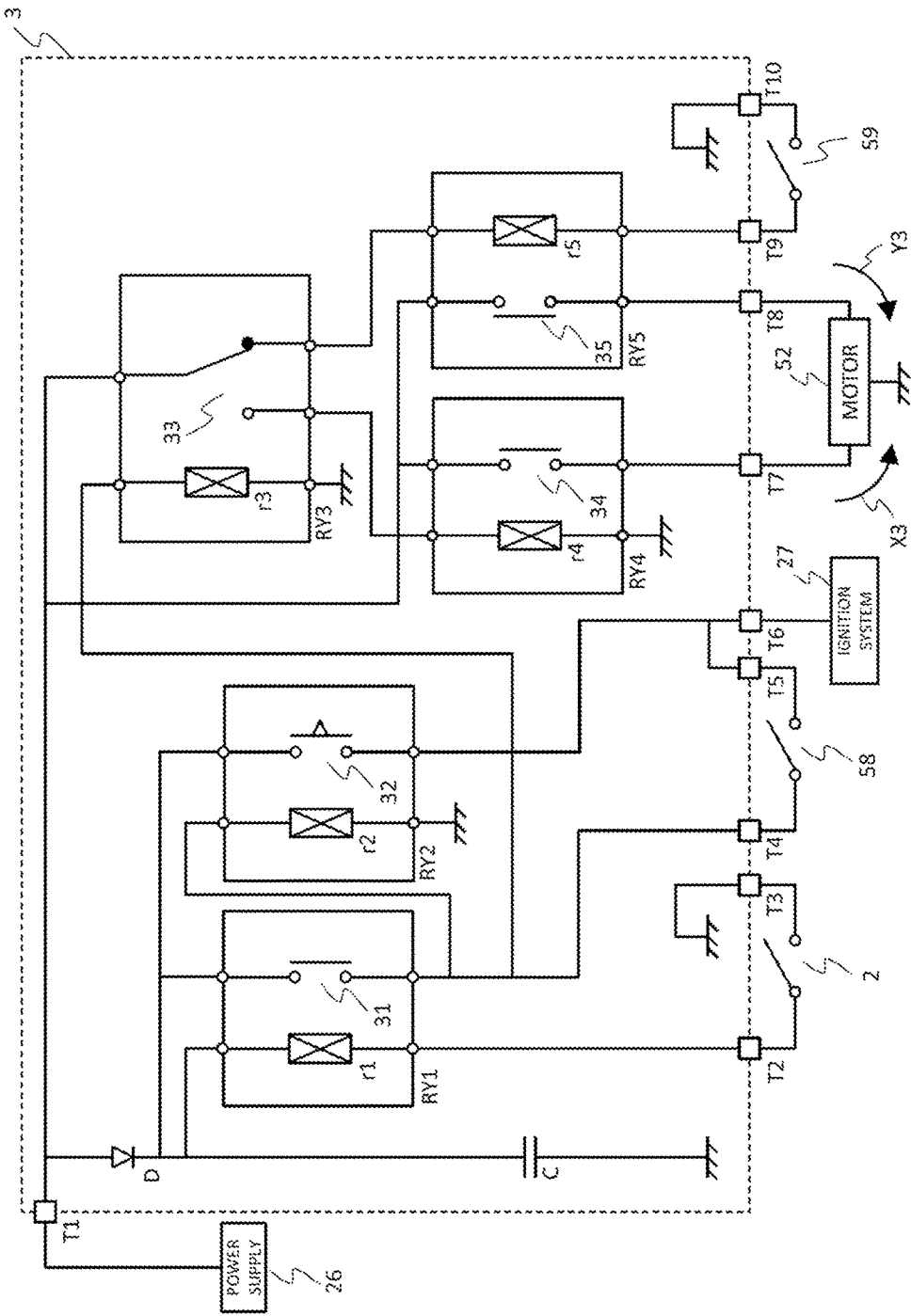
FIG. 6 is an operational explanatory diagram of the control section.

Referring to FIGS. 4 to 6, description is given of an operation of emergency controller 1 at the time of engine startup. If the cap connected to tether cord 25 is on emergency stop switch 2 before the engine is started, emergency stop switch 2 is in the off state, as depicted in FIG. 4.

FIG. 5 depicts a state after the engine is started. Coil r1 of relay RY1 is not energized even when the engine is started in the state depicted in FIG. 4. Likewise, coil r2 of relay RY2, coil r3 of relay RY3, and a coil r4 of relay RY4 are not energized. Meanwhile, a coil r5 of relay RY5 is energized by way of the normally closed contact side of contact 33 of relay RY3. Thus, a current runs through contact 35 of relay RY5. Second limit switch 59 opens when turned on; hence, in the off-state of second limit switch 59, a current flows from terminal T8 to driving mechanism 52. In this state, driving mechanism 52 is driven reversely, and emergency stop mechanism 4 effects a restoring operation.

If emergency controller 1 has been in operation immediately before the engine is started, brake lever 21 comes to, as a result of the restoring operation, the position depicted in FIG. 2A, and second limit switch 59 collides with second surface 54B of rotary plate 54 as depicted in FIG. 3A, so as to be turned on. If emergency controller 1 has not been in operation immediately before the engine is started, brake lever 21 and second limit switch 59 maintain the state depicted in FIGS. 2A and 3A from the pre engine start state regardless of the restoring operation.

FIG. 6 depicts an on state of second limit switch 59. Since second limit switch 59 opens when turned on, current flow is blocked from terminal T8 to driving mechanism 52, and driving mechanism 52 is stopped.

Figure 7:
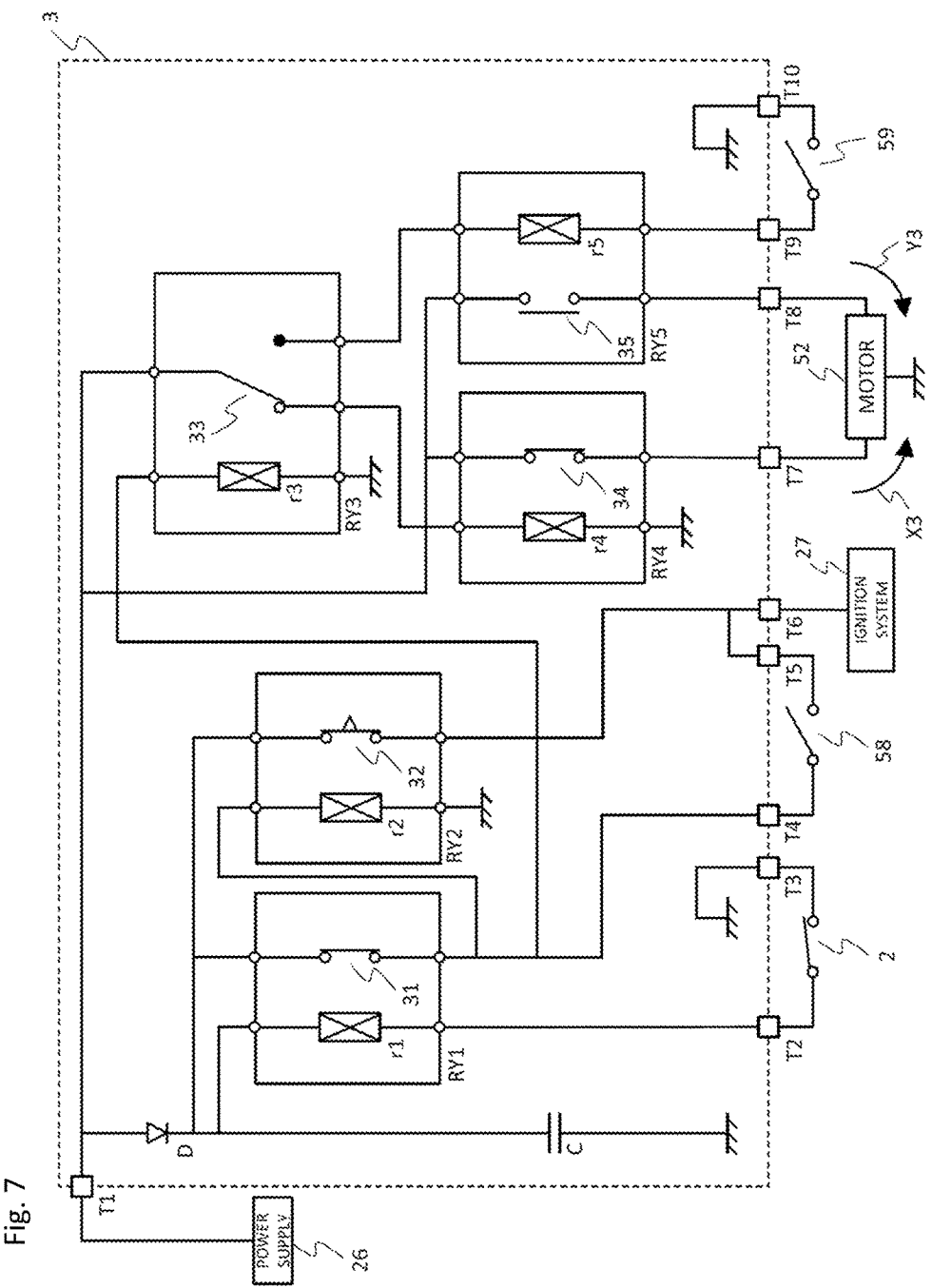
FIG. 7 is an operational explanatory diagram of the control section.
Figure 8:
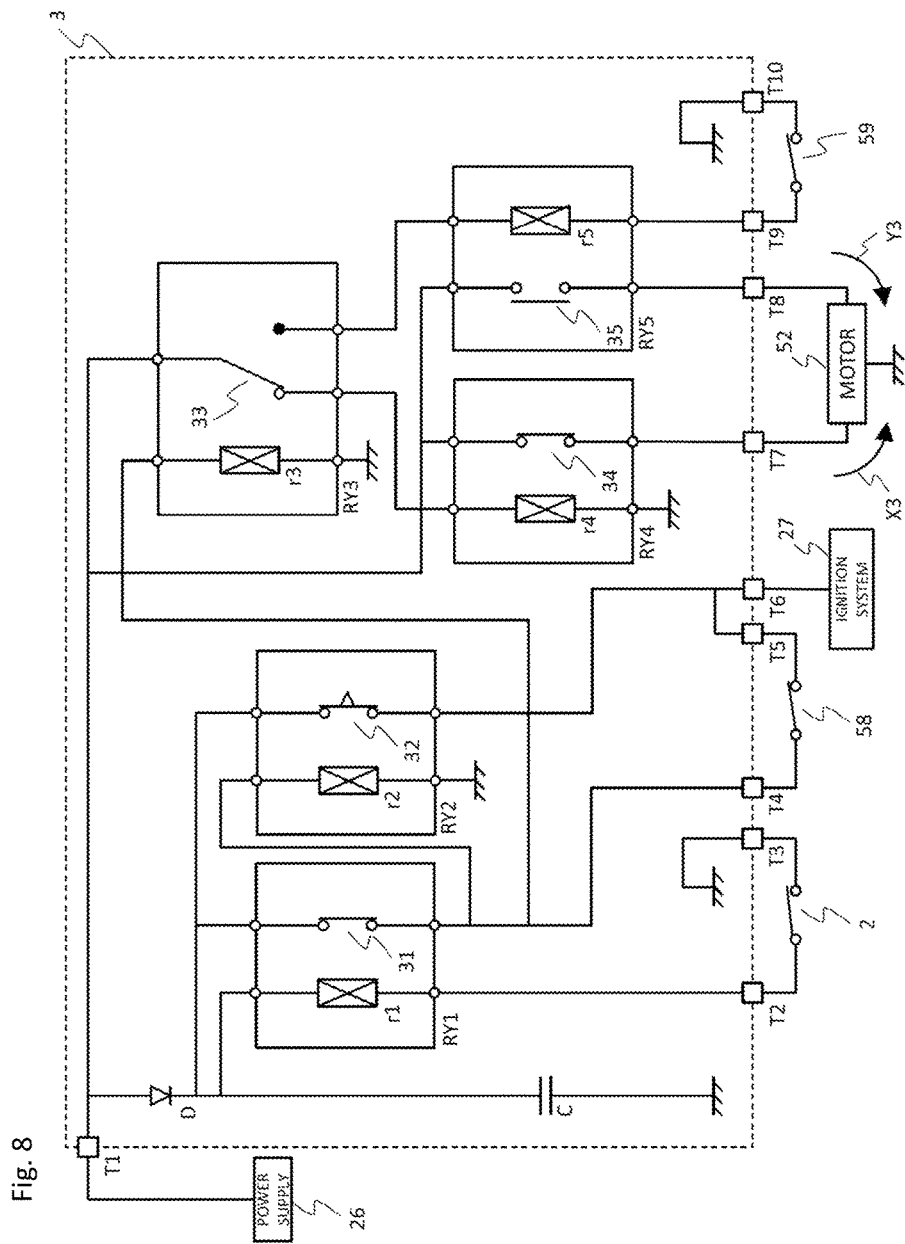
FIG. 8 is an operational explanatory diagram of the control section.

Next, referring to FIGS. 6 to 8, description is give of an operation of emergency controller 1 in executing emergency stop. While snowmobile 10 is running, emergency controller 1 maintains the state depicted in FIG. 6 until emergency stop switch 2 is turned on.

FIG. 7 depicts a state when emergency stop switch 2 is turned on. When emergency stop switch 2 is turned on in the state depicted in FIG. 6, coil r1 of relay RY1 is energized. Then, coil r2 of relay RY2, coil r3 of relay RY3, and coil r4 of relay RY4 are energized sequentially. Thus, a current flows from terminal T7 to driving mechanism 52. Then, driving mechanism 52 is driven forwardly, and emergency stop mechanism 4 carries out the executing operation. As a result, first mechanical portion 40 turns to the state depicted in FIG. 2B, and second mechanical portion 50 turns to the state depicted in FIG. 3B. More specifically, brake lever 21 is brought closer to left handle 17L, and first limit switch 58 collides with piece 56 to be turned on. It is to be noted that second limit switch 59 returns to the off state.

FIG. 8 depicts the on state of first limit switch 58. Since first limit switch 58 closes when turned on, a current flows to ignition system 27, causing the engine to be stopped. Independently of this operation, after a predetermined length of time, for example, two to three seconds, upon energization of coil r2 of relay RY2, contact 32 closes, a current flows to ignition system 27, and the engine is stopped. In other words, the engine stops regardless of whether first limit switch 58 is turned on or not.

As described above, control section 3 is operable to stop operation of the engine upon activation of first limit switch 58, i.e., when emergency stop mechanism detects that braking by the brake mechanism is executed; thus, snowmobile 10 is stopped in the same order as the normal engine stop procedure, as described above. Further, braking by the brake mechanism is reliably executed even in a snowmobile 10 that is not equipped with a battery.

Moreover, control section 3 is operable to stop operation of the engine after a predetermined length of time from when emergency stop switch 2 is turned on regardless of whether first limit switch 58 is turned on or not, i.e., regardless of whether emergency stop mechanism 4 detects that braking by the brake mechanism is executed or not. In this manner, time for actuating the brake mechanism is secured, and the operation of the engine is reliably stopped even if the brake mechanism does not work. Hence, even in an unlikely event of there being something wrong with emergency stop mechanism 4, the function to be provided as it should be, i.e., the function of shutting down the engine is at least provided.

Referring back to FIGS. 4 to 6, description is given of an operation of emergency controller 1 in restoration. After snowmobile 10 is stopped at an emergency by emergency controller 1, the driver puts the cap back on emergency stop switch 2 and turns off emergency stop switch 2, bringing the state of FIG. 4. When the engine is started in the state depicted in FIG. 4, the state from FIG. 5 to FIG. 6 takes place in the same manner as the above-described operation of emergency controller 1 at the time of engine start. More specifically, driving mechanism 52 is driven reversely and emergency stop mechanism 4 performs the restoring operation, as a result of which brake lever 21 returns to the original position (see FIG. 2A), second limit switch 59 is turned on (see FIG. 3A) current flow is blocked from terminal T8 to driving mechanism 52, and driving mechanism 52 is stopped.

In this manner, control section 3 is operable in restoration control to stop emergency stop mechanism 4 upon activation of second limit switch 59, i.e., after emergency stop mechanism 4 detects that braking by the brake mechanism is released; therefore, braking by the brake mechanism is reliably released at the time of vehicle restart after the restoration, and emergency stop mechanism 4 does not remain activated.

As has been described, control section 3 performs the execution control to cause emergency stop mechanism 4 to execute braking by the brake mechanism as well as to stop operation of the engine when emergency stop switch 2 is turned on while the engine is in operation. Further, control section 3 performs the restoration control to cause emergency stop mechanism 4 to release braking by the brake mechanism when emergency stop switch 2 is turned off and the engine is started. In this manner, even when, for example, the driver is thrown and leaves snowmobile 10 while traveling, snowmobile 10 is safely stopped. Moreover, the same operation as the normal engine start is performed to restore the original state in restarting the engine of snowmobile 10. The same operation as the normal engine start means putting the cap on emergency stop switch 2 and setting main switch 24 to the starting position.

An existing emergency stop switch dedicated to engine stop is applicable for emergency stop switch 2 in the above description. Thus, emergency controller 1 is easily installable to already commercially available snowmobiles 10.

Tether cord 25 may be substituted with, for example, a combination of a near field communication antenna installed on snowmobile 10 and a near field communication transmitter to be held by the driver, as described in Japanese Patent No. 4,205,261. In this case, it is constructed such that emergency stop switch 2 is turned on when the driver leaves snowmobile 10 and the antenna becomes unable to receive radio waves from the transmitter.

Control section 3 may be configured by adding a program to implement the operations of the control circuit depicted in FIGS. 4 to 8 to an engine controller that is pre-installed for controlling the engine of snowmobile 10 or other electronic control units. Further, control section 3 may be configured as a dedicated electronic control unit for implementing the operations of the control circuit depicted in FIGS. 4 to 8.

A motor is used for driving mechanism 52 of emergency stop mechanism 4; in addition to a rotary motor that has a rotary shaft and produces a rotational motion, also applicable is a linear motor that does not have a rotary shaft and produces a linear motion. In the case of an emergency stop mechanism 4 with a linear motor, a linear motion in a first direction is defined as forward driving, and a linear motion in a second direction that is opposite the first direction is defined as reverse driving, in executing and releasing braking by the brake mechanism.

Emergency stop mechanism 4 may be configured as a hydraulic driving mechanism that is driven forwardly to execute braking by the brake mechanism and is driven reversely to release braking by the brake mechanism. In this case, the hydraulic driving mechanism is operable to turn on/off limit switches. Further, emergency stop mechanism 4 may include an electrically driven brake mechanism, and an electronic control unit may implement the forward driving to execute braking by the electrically driven brake mechanism and reverse driving to release braking by the electrically driven brake mechanism, as well as turning on/off of limit switches. In this case, in a snowmobile 10 without a battery, control section 3 performs control so as to prevent the engine from being stopped for a predetermined length of time, i.e., time that the electrically driven brake mechanism takes to become operative, from the activation of emergency stop switch 2. In either case, a single mechanism enables execution and release of braking by the brake mechanism like the example depicted in FIGS. 2A and 2B and FIGS. 3A and 3B, thus allowing for easy downsizing and enhancing reliability.

Second Embodiment

Figure 9:
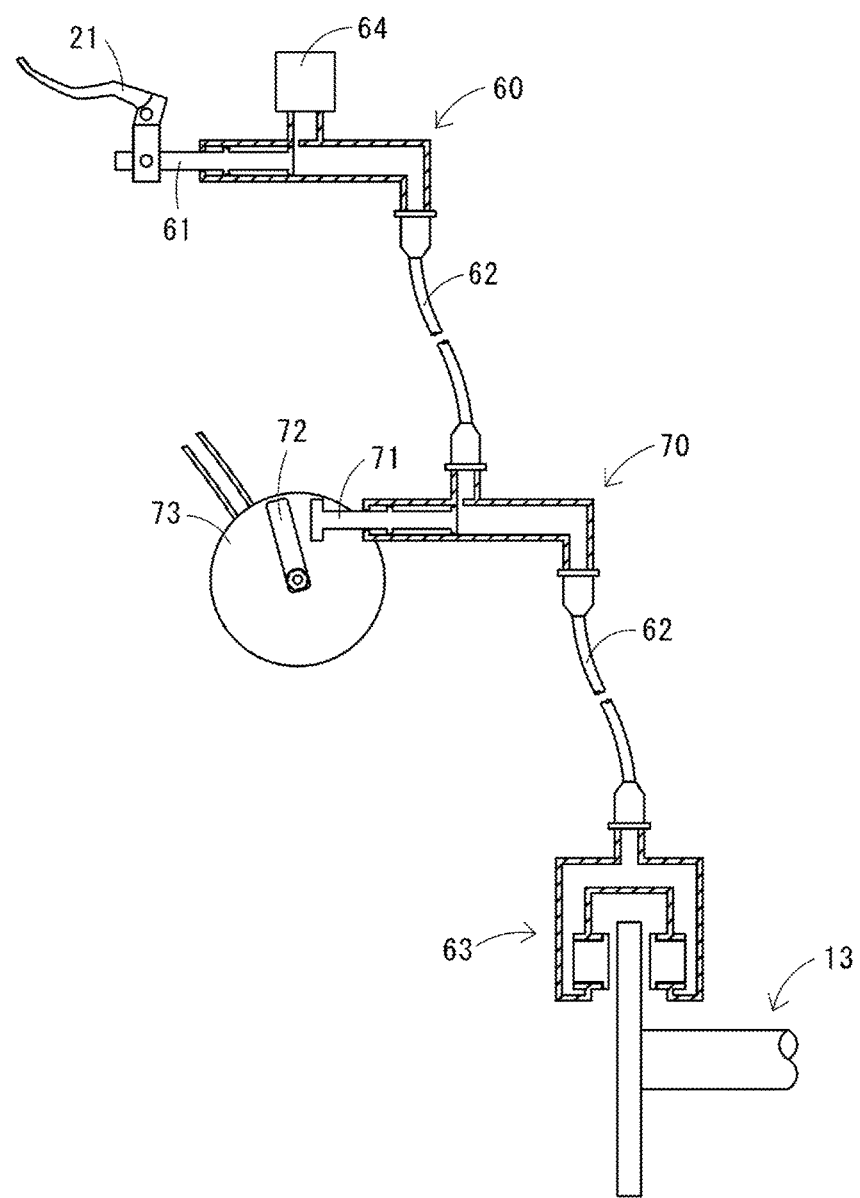
FIG. 9 is an explanatory diagram of a portion of an emergency stop mechanism according to a second embodiment of the invention.

FIG. 9 depicts a portion of an emergency stop mechanism 4 according to a second embodiment of the invention. In this embodiment, a hydraulic brake mechanism is used for the brake mechanism. A snowmobile 10 is used for illustration, and the overall construction of this embodiment is the same as that of the first embodiment. The same components as those of the first embodiment are given the same reference numerals used in the first embodiment, and detailed description thereof is not redundantly given.

With reference to FIG. 9, the brake mechanism includes a brake lever 21, a first hydraulic cylinder 60 in which a first piston rod 61 is slidable upon operation of brake lever 21, a brake hose 62 connected to first hydraulic cylinder 60, a brake pad 63 connected to brake hose 62, and a tank 64 for feeding brake hose 62 with brake fluid. Tank 64 is attached to brake lever 21, and brake lever 21 and brake pad 63 are linked by way of brake hose 62.

A second hydraulic cylinder 70 is disposed between first hydraulic cylinder 60 and brake pad 63 as emergency stop mechanism 4. Second hydraulic cylinder 70 includes a second piston rod 71 that is slidable in response to a signal from control section 3. Further, emergency stop mechanism 4 includes a turnable pressing member 72 that is located at an end of second piston rod 71 and is operable to press second piston rod 71, and a driving mechanism 73 for turning turnable pressing member 72. Driving mechanism 73 is driven forwardly and reversely under the control of control section 3.

In the configuration as above, the driver grips brake lever 21 to apply the brakes in normal driving as in the first embodiment. Brake lever 21 is gripped, causing an end of first piston rod 61 to be pressed by brake lever 21, and first piston rod 61 is thus slid rightward in the figure. Slid first piston rod 61 blocks the communication between tank 64 and brake hose 62, causing rise in pressure inside brake hose 62. Rise in pressure inside brake hose 62 causes brake pad 63 to be pressed against a disc rotor of driving track belt mechanism 13, such that the brakes are applied.

In a case where, for example, the driver is thrown while the engine is in operation, the cap is pulled by tether cord 25 fastened to the driver, thus turning on emergency stop switch 2 to enable control section 3 (not shown.) Then, control section 3 causes emergency stop mechanism 4 to execute braking by the brake mechanism. More specifically, when emergency stop switch 2 is turned on, driving mechanism 73 is driven forwardly under the control of control section 3, and turnable pressing member 72 is turned clockwise, so as to press second piston rod 71 rightward in the figure. Second piston rod 71 is moved by being pressed, such that the communication is blocked between tank 64 and brake hose 62 downstream of second hydraulic cylinder 70, and that the internal pressure of the brake hose rises downstream of second hydraulic cylinder 70. Rise in pressure of brake hose 62 causes brake pad 63 to be pressed against the disc rotor, such that the brakes are applied. Further, the ignition system works to stop operation of the engine under the control of control section 3. In this manner, operation of the engine is stopped and braking by brake mechanism is executed in an emergency situation, hence preventing snowmobile 10 from traveling farther even on, for example, a slope. In other words, snowmobile 10 is safely stopped even when the driver is thrown.

Next, description is given of a restoring operation of emergency stop mechanism 4. The driver thrown from snowmobile 10 gets back to snowmobile 10 and puts the cap of tether cord 25 on emergency stop switch 2 to reset emergency stop switch 2 to the off state. When the driver turns main switch 24 to the starting position to start the engine with emergency stop switch 2 in the off state, driving mechanism 73 is driven reversely under the control of control section 3, and turnable pressing member 72 moves away from the end of second piston rod 71. Second hydraulic cylinder 70 contains a spring for urging second piston rod 71 in the leftward direction in the figure, and upon release of pressure from turnable pressing member 72, second piston rod 71 moves and returns leftward in the figure by the action of the spring. Thus, second piston rod 71 moves to release braking by the brake mechanism.

As described above, in the second embodiment also, braking by the brake mechanism is executed and operation of the engine is stopped in an emergency situation like the driver being thrown while driving, such that snowmobile 10 is safely stopped. Further, at the time of restarting the engine of snowmobile 10, the original state is restored by the same operation as normal engine start. It is to be noted that the control circuit of control section 3 may have the same configuration as that of the first embodiment, or alternatively, may execute braking by the brake mechanism and stop operation of the engine simultaneously.

In the second embodiment, although second hydraulic cylinder 70 is positioned downstream of first hydraulic cylinder 60, second hydraulic cylinder 70 may be positioned upstream of first hydraulic cylinder 60 instead. In either case, effects of the present invention are achievable simply by adding an emergency stop mechanism implemented by second hydraulic cylinder 70 to an existing brake mechanism operable by regular operation of brake lever 21.

Suitable embodiments of the emergency controller and other parts according to the present invention have been described above with reference to the accompanying drawings. The present invention is however not limited to such examples. It is apparent to those skilled in the art that various examples of variations and modifications are conceivable within the scope of the technical ideas disclosed in the present application, and it is appreciated that such variations and modifications are obviously encompassed by the technical scope of the present invention.

EXPLANATION OF REFERENCE SIGNS

1 . . . EMERGENCY CONTROLLER
2 . . . EMERGENCY STOP SWITCH
3 . . . CONTROL SECTION
4 . . . EMERGENCY STOP MECHANISM
10 . . . SNOWMOBILE (VEHICLE)
21 . . . BRAKE LEVER
58 . . . FIRST LIMIT SWITCH
59 . . . SECOND LIMIT SWITCH
60 . . . FIRST HYDRAULIC CYLINDER
61 . . . FIRST PISTON ROD
62 . . . BRAKE HOSE
63 . . . BRAKE PAD
64 . . . TANK
70 . . . SECOND HYDRAULIC CYLINDER
71 . . . SECOND PISTON ROD
72 . . . TURNABLE PRESSING MEMBER (PRESSING MEMBER)
73 . . . DRIVING MECHANISM

The invention claimed is:

1. An emergency controller installable in a vehicle including an engine and a brake mechanism, the emergency controller, comprising:
an emergency stop switch to be activated upon detection of an emergency;
a control section to be enabled upon activation of the emergency stop switch; and
an emergency stop mechanism configured to execute and release braking by the brake mechanism under control of the control section, wherein
the control section is configured to perform execution control for causing the emergency stop mechanism to execute braking by the brake mechanism and stopping operation of the engine upon the condition that the emergency stop switch is activated while the engine is in operation,
the control section is configured to perform restoration control for causing the emergency stop mechanism to release the braking by the brake mechanism upon the condition that the emergency stop switch is deactivated and the engine is started,
the brake mechanism is a hydraulic brake mechanism, the brake mechanism including:
a brake lever;
a first hydraulic cylinder having a first piston rod that is slidable in response to an operation of the brake lever;
a brake hose connected to the first hydraulic cylinder;
a brake pad connected to the brake hose; and
a tank for feeding the brake hose with brake fluid,
the emergency stop mechanism further comprises a second hydraulic cylinder, the second hydraulic cylinder being at a position upstream of the first hydraulic cylinder or a position downstream of the first hydraulic cylinder and having a second piston rod that is slidable in response to a signal from the control section, wherein
upon the condition that the second piston rod is slid, communication is blocked between the tank and the brake hose at a downstream side of the second hydraulic cylinder and a rise in pressure is caused inside the brake hose at the downstream side of the second hydraulic cylinder, such that the brake pad is pressed.

2. The emergency controller according to claim 1, wherein
the emergency stop mechanism includes:
   a pressing member that is operable to press the second piston rod of the second hydraulic cylinder; and
   a driving mechanism that is operable to move the pressing member, and
the driving mechanism is configured to be driven forwardly according to the execution control to press the piston rod, and the driving mechanism is configured to be driven reversely according to the restoration control to release the pressure on the piston rod.

* * * * *